United States Patent [19]
Wallner

[11] Patent Number: 5,836,607
[45] Date of Patent: Nov. 17, 1998

[54] GAS GENERATOR ATTACHMENT MEANS FOR A VEHICLE SAFETY APPARATUS

[75] Inventor: John P. Wallner, Rochester, Mich.

[73] Assignee: TRW Vehicle Safety Systems Inc., Lyndhurst, Ohio

[21] Appl. No.: 611,374

[22] Filed: Mar. 5, 1996

[51] Int. Cl.[6] .................................................. B60R 21/20
[52] U.S. Cl. ...................................... 280/728.2; 280/741
[58] Field of Search ............................... 280/741, 728.1, 280/728.2, 731

[56] References Cited

U.S. PATENT DOCUMENTS

| | | |
|---|---|---|
| 4,153,273 | 5/1979 | Risko . |
| 4,964,654 | 10/1990 | Bishop et al. . |
| 5,069,480 | 12/1991 | Good .................................... 280/728.2 |
| 5,257,815 | 11/1993 | Bachelder et al. . |
| 5,308,108 | 5/1994 | Rion . |
| 5,328,203 | 7/1994 | Baba et al. . |
| 5,342,084 | 8/1994 | Rose et al. . |
| 5,356,175 | 10/1994 | Rose et al. . |
| 5,370,416 | 12/1994 | Hamada . |
| 5,449,195 | 9/1995 | Garner . |
| 5,544,911 | 8/1996 | Vine ..................................... 280/728.2 |
| 5,577,764 | 11/1996 | Webber et al. ......................... 280/732 |
| 5,620,200 | 4/1997 | Garner et al. ........................ 280/728.2 |

*Primary Examiner*—Eric D. Culbreth
*Attorney, Agent, or Firm*—Tarolli, Sundheim, Covell, Tummino & Szato

[57] ABSTRACT

A vehicle safety apparatus (10, 10a) for helping to protect a vehicle occupant during a vehicle collision above a predetermined threshold. The apparatus (10, 10a) includes a reaction canister (14, 14a), an inflatable vehicle occupant protection device (16) located in the reaction canister, and an inflator (18, 18a) for supplying inflation fluid to inflate the vehicle occupant protection device. The reaction canister (14, 14a) has a main body portion (20), a first end wall (24) and a second end wall (26, 26a) opposing the first end wall. The first and second end walls (24, 26, and 26a) are fixed to the main body portion (20) and define a chamber (40). The first end wall (24) has an inner surface (46) and an outer surface (48). A first opening (52) having a first diameter is formed in the first end wall. The inflator (18, 18a) has a cylindrical body portion (82, 82a) having a first end (86) and a second end (90, 90a) opposite the first end. A flange member (130) is fixed to the first end (86) of the inflator (18, 18a). The inflator (18, 18a) is axially insertable through, the first opening (52), into the chamber (40). The flange member 130 is clamped against the outer surface (48) of the first end wall (24). The inflator (18, 18a) is supported on the second end wall (26, 26a).

5 Claims, 3 Drawing Sheets

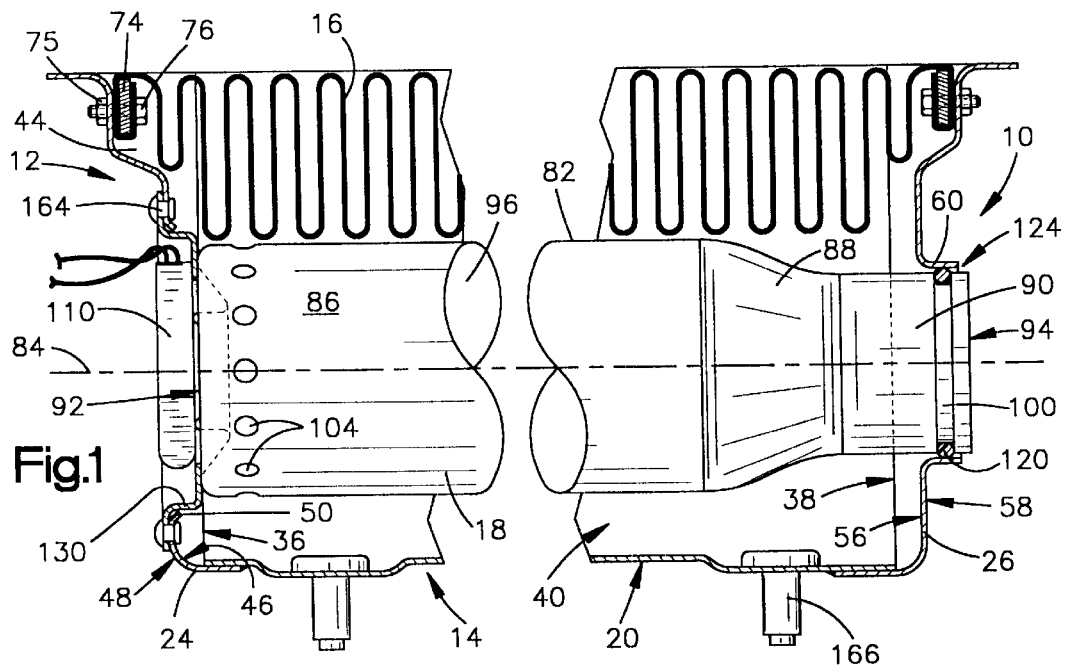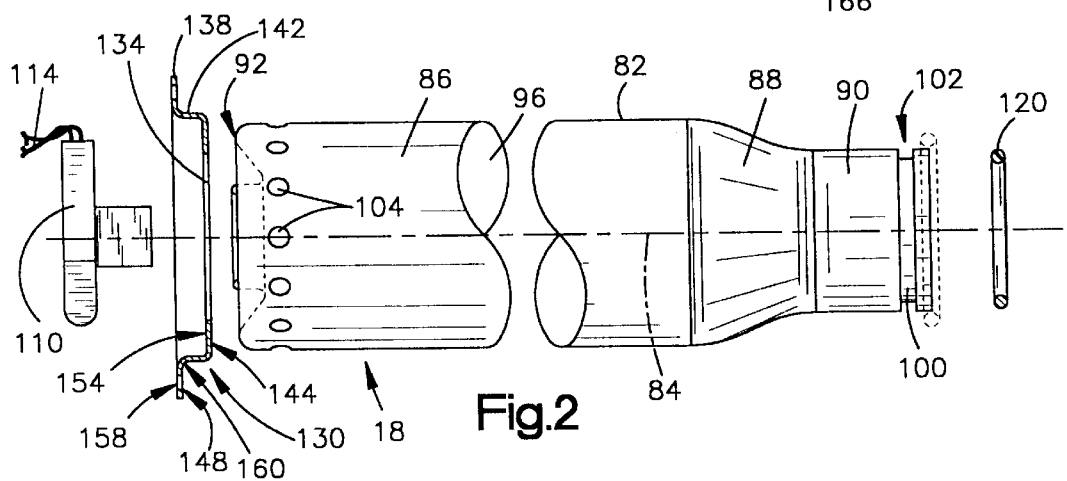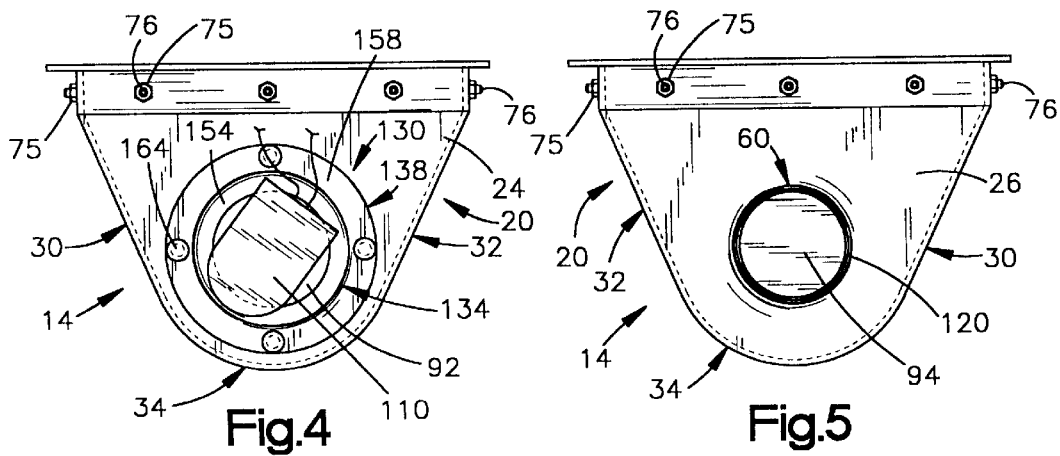

GAS GENERATOR ATTACHMENT MEANS FOR A VEHICLE SAFETY APPARATUS

BACKGROUND OF THE INVENTION

A vehicle safety apparatus typically includes an inflatable vehicle occupant protection device, such as an air bag, an actuatable inflator for providing inflation fluid for inflating the air bag, and a canister which houses the air bag and the inflator. Upon detecting an event indicative of a vehicle collision above a predetermined threshold, the inflator is actuated to inflate the air bag. The inflated air bag is positioned between the occupant and parts of the vehicle to help protect the occupant from forcibly striking the parts of the vehicle.

SUMMARY OF THE INVENTION

The present invention is an apparatus for helping to protect a vehicle occupant during a collision for which protection of the vehicle occupant is desired. The apparatus comprises an inflatable vehicle occupant protection device located within a reaction canister. The apparatus also includes an inflator for supplying inflation fluid to inflate the vehicle occupant protection device.

The reaction canister includes a main body portion, a first end wall and a second end wall. The main body portion and the first and second end walls define a chamber. The first end wall has an inner surface and an outer surface. The first end wall further has a first opening having a first diameter. The inflator has a cylindrical body portion including a first end and a second end opposite the first end. The first end terminates in a first end wall. A flange member is fixed to the first end wall of the inflator. The inflator is axially insertable, through the first opening, into the chamber. The apparatus further includes means for clamping the flange member against the outer surface of the first end wall. The apparatus also includes means for supporting the second end of the inflator on the second end wall.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic sectional view of a vehicle safety apparatus embodying the present invention;

FIG. 2 is an exploded view of parts of the safety apparatus illustrated in FIG. 1;

FIG. 4 is an end view of the safety apparatus illustrated in FIG. 1;

FIG. 5 is a view similar to FIG. 4 showing a different end of the safety apparatus;

DESCRIPTION OF PREFERRED EMBODIMENT

Figure 3:
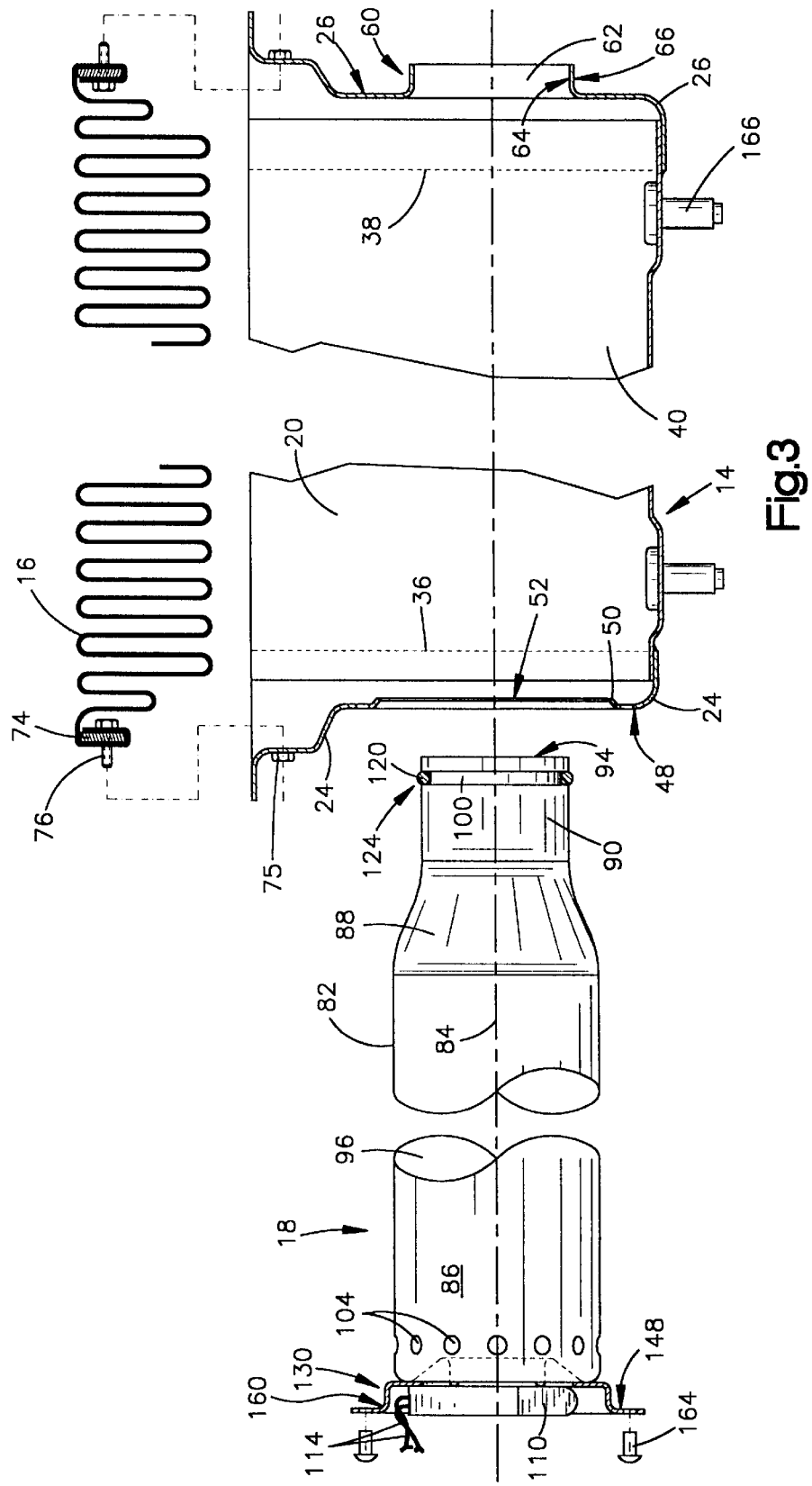
FIG. 3 is an exploded view of the safety apparatus illustrated in FIG. 1.

A vehicle safety apparatus 10 comprising a first embodiment of the present invention is shown in FIG. 1. The vehicle safety apparatus 10 includes an air bag module 12. The air bag module 12 is mounted in a vehicle (not shown) at a suitable location such as in an instrument panel of the vehicle. The air bag module 12 includes a reaction canister 14, an air bag 16 and an inflator 18 for supplying inflation fluid to inflate the air bag.

The reaction canister 14 has a main body portion 20, a first end wall 24, and a second end wall 26 spaced apart from the first end wall. The main body portion 20 of the canister 14 is preferably one-piece and extruded from an aluminum alloy or cast from a magnesium alloy. The main body portion 20 comprises a left side wall 30, as viewed in FIG. 4, a right side wall 32 spaced from the left side wall and a central wall 34 extending between and interconnecting the left and right side walls. The main body portion 20 thus has a somewhat U-shaped cross-section as viewed in FIG. 4. The main body portion 20 has a first end 36 (FIG. 1) and a second end 38 opposite the first end.

The first end wall 24 is secured to the first end 36 of the main body portion 20 by conventional means (e.g., welding, rivets, threaded fasteners, or similar structure). The second end wall 26 is secured to the second end 38 of the main body portion 20 also by conventional means (e.g., welding, rivets, threaded fasteners, or similar structure). The main body portion 20, the first end wall 24, and the second end wall 26 cooperate to define a chamber 40. A mouth portion 44 of the reaction canister 14 is located in the upper portion (as viewed in the drawings) of the reaction canister.

The first end wall 24 has an inner surface 46 and an outer surface 48. The first end wall 24 further includes an axially and radially inward tapered rim portion 50, as best seen in FIG. 3. The rim portion 50 defines a first opening 52 having a first diameter. The first opening 52, as illustrated in the Figures, is circular, but could also be a different shape.

The second end wall 26 includes an inner surface 56 and an outer surface 58. The second end wall 26 has a flanged rim portion 60 defining a second opening 62 (FIG. 3). The second opening 62 has a second diameter smaller than the first diameter. The flanged rim portion has an inner surface 64 and an outer surface 66. While the flanged rim portion 60 is illustrated in the Figures as defining the second opening 62, the flanged rim portion could instead terminate in a closed cup formation (not shown) defining a recess (not shown), having a diameter substantially the same as the second diameter.

The air bag 16 is folded and retained in the mouth portion 44 of the reaction canister 14 as shown in FIG. 1. The air bag 16 is retained around the perimeter of the mouth portion 44 by a retaining ring 74 secured to the mouth portion by a plurality of nuts 75 and bolts 76 or other conventional means. The air bag 16 is made from a fabric material, preferably woven nylon. The retaining ring 74 is generally rectangular and is preferably made from sheet metal or as a metal casting.

The inflator 18 is housed within the reaction canister 14 for supplying inflation fluid to inflate the air bag 16. The inflator 18, as best seen in FIG. 2, has an elongated, cylindrical wall 82 with a longitudinal central axis 84, a first end 86, a radially tapered neck portion 88, and a second end 90 opposite the first end. The first end 86 of the inflator 18 terminates in a first end wall 92. The second end 90 of the inflator 18 terminates in a second end wall 94 (FIG. 3).

The first end 86 of the inflator 18 has a third diameter and the second end 90 has a fourth diameter. The fourth diameter can be smaller than the third diameter, as shown in the Figures, or can be equal to or larger than the third diameter. However, the third diameter is smaller than the first diameter, and the fourth diameter is smaller than the second diameter.

The cylindrical wall 82, and the first and second end walls 92 and 94 cooperate to define a storage chamber 96. A source of inflation fluid for inflating the air bag 16 is located within the storage chamber 96 of the inflator 18. The inflation fluid source may be a combustible mixture of gases, a quantity of stored gas, a combination of combustible material and a stored gas, or material which when ignited generates gas.

The first end 86 of the cylindrical wall 82 of the inflator 18 includes a plurality of discharge openings 104. The discharge openings 104 are closely spaced from each other in a circular array extending around the circumference of the cylindrical wall 82 and adjacent to the first end wall 92 of the inflator 18.

An annular groove 100 extends circumferentially about the second end of 90 of the inflator 18. The annular groove 100 defines an annular groove portion 102 of the inflator 18 adjacent to the second end wall 94. The annular groove portion 102 has a fifth diameter smaller than the fourth diameter.

A circular O-ring 120 is securely received within the annular groove 100 of the annular groove portion 102 of the second end 90 of the inflator 18. The O-ring 120 is made of a resiliently deformable material, preferably rubber. The O-ring 120 has an initial inner diameter smaller than the fifth diameter of the annular groove portion 102. The O-ring 120 is stretchable so that its inner diameter can be expanded to position the O-ring over the second end 90 of the inflator 18 and into the annular groove 100. Since the O-ring 120 is resilient, the O-ring will spring back towards its initial inner diameter to an operational diameter which is substantially the same size as the fifth diameter of the annular groove portion 102. Thus, the O-ring 120 is securely retained within the annular groove 100 of the annular groove portion 102 of the inflator 18 to form a mating portion 124, as best seen in FIG. 3. The mating portion 124 has a sixth diameter which is slightly larger than the second diameter of the second opening 62. The outer peripheral portion of the mating portion 124 is thus defined by the outer surface of the O-ring 120. Therefore, as can be seen in FIG. 3, the outer periphery of the mating portion 124 comprises a continuous layer of resilient, deformable, material.

An annular flange member 130 (FIG. 1) is fixed to the first end wall 92 of the first end 86 of the inflator 18 by means of welding, bonding, press-fitting, fusing or other conventional means. The flange member 130 is preferably a one-piece member made of steel. The flange member 130, as best seen in FIG. 2, has a planar first portion 134, a planar second portion 138 spaced apart and parallel to the planar first portion, and a connecting portion 142 extending between and connecting the first and second portions together. The first, second and connecting portions 134, 138 and 142 are all annular in shape. The first portion 134 and the second portion 138 each have an inner surface 144 and 148, respectively, and an outer surface 154 and 158, respectively. The connecting portion 142 has an inner diameter which is substantially the same size as the first diameter. However, the connecting portion 142 does have a bent portion 160 adjacent to the second portion 138 having an outer diameter slightly larger than the first diameter.

An electrically actuatable initiator assembly 110 (FIG. 2) is attached to the first end wall 92 of the inflator 18. The initiator assembly 110 has a pair of wires 114 connected to a sensor means (not shown). The sensor means communicates an electrical signal to the initiator assembly 110 and actuates the initiator assembly upon the occurrence of an event, such as a rapid deceleration, indicating a vehicle collision above a predetermined threshold. The inflation fluid is then released to exit the storage chamber 96 and to flow outward from the inflator 18 through the discharge openings 104 to inflate the air bag 16.

To assemble the vehicle safety apparatus 10, the air bag 16 is attached to the mouth portion 44 (FIG. 1) of the reaction canister 14. The air bag 16 is mounted in the reaction canister 14 by inserting the retaining ring 74 into an open end of the air bag. The bolts 76 are inserted through openings in the air bag 16, the retaining ring 74, and the reaction canister. The nuts 75 are fastened to the bolts 76, thereby securing the air bag 16 to the reaction canister 14.

The inflator 18 is then axially inserted along the central axis 84, as best seen in FIG. 3, through the first opening 52, into the chamber 40 of the reaction canister 14. Specifically, the second end 90 of the inflator 18 is inserted initially through the first opening 52 and continues to move along axis 84 into the chamber 40 toward the second end wall 26 until the O-ring 120 of the mating portion 124 of the second end engages the inner surface 64 of the flanged rim portion 60 of the second end wall of the reaction canister 14. The inflator 18 continues its forward movement into the chamber 40 until the inner surface 148 of the planar second portion 138 of the flange member 130 engages the outer surface 48 of the first end wall 24 of the reaction canister 14. The planar second portion 138 of the flange member 130 is then secured to the first end wall 24 of the reaction canister 14 by a first plurality of rivets 164, as shown in FIG. 1, or by other conventional means. The air bag module 12 is then attached to the vehicle (not shown) by a second plurality of rivets 166, or other conventional means.

As can be seen in FIG. 1, the O-ring 120 of the mating portion 124 provides a continuous layer of resilient deformable material between the second end 90 of the inflator 18 and the reaction canister 14. Thus, the O-ring 120 provides a tight seal and an isolation member between the inflator 18 and the reaction canister 14, thereby preventing relative movement and direct contact of the inflator 18 and the reaction canister.

Figure 6:
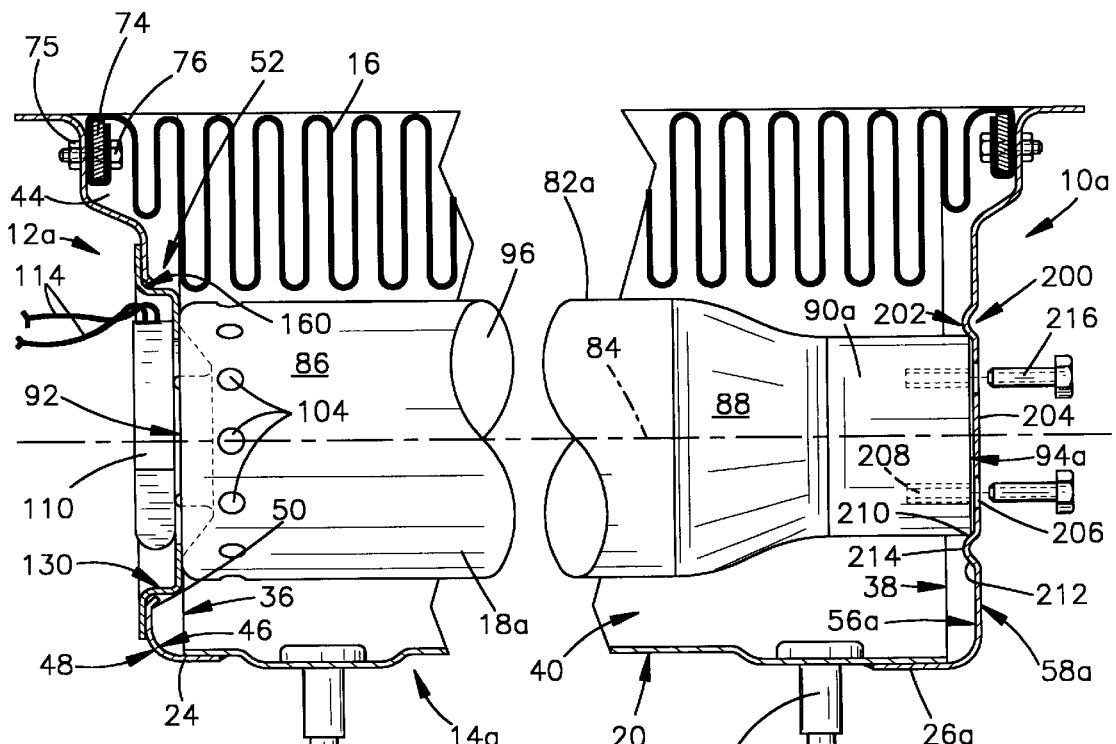
FIG. 6 is a view similar to FIG. 1 showing a second embodiment of the safety apparatus of the present invention.
Figure 7:
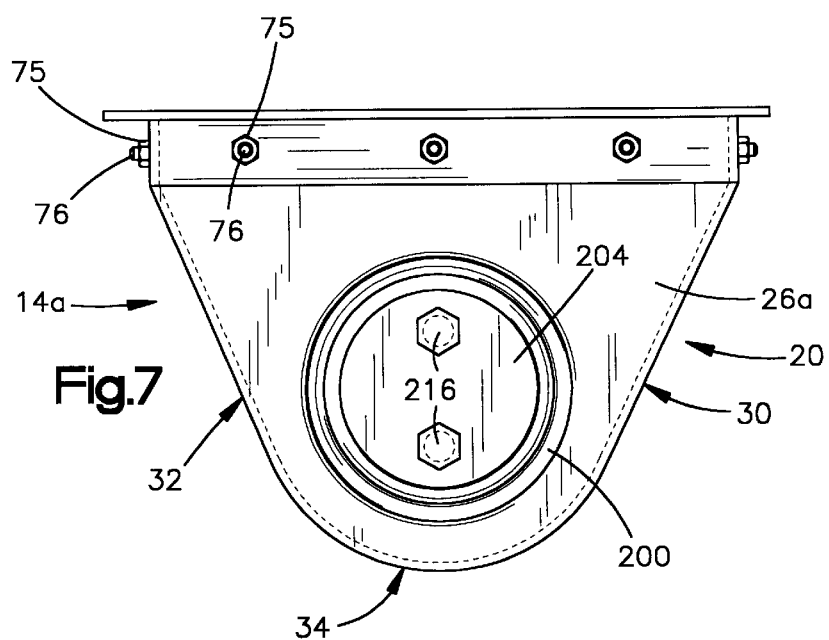
FIG. 7 is a view similar to FIG. 4 showing the safety apparatus of FIG. 6.

FIGS. 6 and 7 illustrate a vehicle safety apparatus 10a which is constructed according to a second embodiment of the present invention. Parts of the vehicle safety apparatus 10a which are the same as parts of the safety apparatus 10 (FIGS. 1–5) are given the same reference numeral. Parts of the vehicle safety apparatus 10a which are different or modified versions of the parts of the vehicle safety apparatus 10 are given the same reference numeral with a suffix a.

The vehicle safety apparatus 10a includes an air bag module 12a. The air bag module 12a includes a reaction canister 14a, the air bag 16 and an inflator 18a for supplying inflation fluid to inflate the air bag.

The reaction canister 14a has the main body portion 20, the first end wall 24, and a second end wall 26a spaced apart from the first end wall. The first end wall 24 is secured to the first end 36 of the main body portion 20 by conventional means (e.g., welding, rivets, threaded fasteners or similar structure). The second end wall 26a is secured to the second end 38 of the main body portion 20 also by conventional means (e.g., welding, rivets, threaded fasteners or similar structure). The main body portion 20, the first end wall 24, and the second end wall 26a cooperate to define the chamber 40. The mouth portion 44 is located in the upper portion (as viewed in the drawings) of the reaction canister 14a.

The first end wall 24 has the inner surface 46 and the outer surface 48. The first end wall 24 further includes the inwardly tapered rim portion 50. The rim portion 50 defines the first opening 52 having the first diameter.

The second end wall 26a includes an inner surface 56a and an outer surface 58a. The second end wall 26a has an annular groove 200 formed on the outer surface 58a and defining a raised rib portion 202 on the inner surface 56a. Thus, the rib portion 202 extends axially towards the first end wall 24 of the reaction canister 14a into the chamber 40. The raised rib portion 202 circumscribes and defines a circular portion 204 of the second end wall 20a.

The rib portion 202 includes a radially inwardly curved surface 210, extending to the circumference of the circular portion 204 and a radially outwardly curved surface 212, extending to the inner surface 56a of the second end wall 90a. The inwardly curved surface 210 and the outwardly curved surface 212 meet at, and depend from, an apex 214 of the rib portion 202.

The circular portion 204 has a seventh diameter smaller than the first diameter. The circular portion 204 is also provided with a plurality of fastener openings 206. Two fastener openings 206 are shown in the embodiment illustrated in FIG. 6. However, it is anticipated that any number of fastener openings 206 could be provided.

The inflator 18a is housed within the reaction canister 14a for supplying inflation fluid to inflate the air bag 16. The inflator 18a has an elongated, cylindrical wall 82a with the longitudinal central axis 84, the first end 86, the radially tapered neck portion 88, and a second end 90a opposite the first end. The first end 86 of the inflator 18a terminates in the first end wall 92. The second end 90a of the inflator 18a terminates in a second end wall 94a. The second end wall 94a of the inflator 18a includes a plurality of threaded openings 208 corresponding in size, number and location with the plurality of fastener openings 206 on the second end wall 26a of the reaction canister 14a.

The second end 90a of the inflator has an eighth diameter. The eighth diameter can be smaller than the third diameter as shown in FIG. 6, or can be equal to or larger than the third diameter. However, the third diameter is smaller than the first diameter, and the eighth diameter is substantially the same size as the seventh diameter.

The cylindrical wall 82a, the first end wall 92 and the second end wall 94a cooperate to define the storage chamber 96. A source of inflation fluid for inflating the air bag 16 is located within the storage chamber 96 of the inflator 18a. The first end 86 of the cylindrical wall 82a of the inflator 18a includes the plurality of discharge openings 104.

The annular flange member 130 is fixed to the first end wall 92 of the first end 86 of the inflator 18 by means of welding, bonding, press-fitting, fusing or other conventional means.

The electrically actuatable initiator assembly 110 is attached to the first end wall 92 of the inflator 18a. The initiator assembly 110 has the pair of wires 114 connected to the sensor means (not shown). The sensor means communicates an electrical signal to the initiator assembly 110 and actuates the initiator assembly upon the occurrence of an event indicating a vehicle collision above a predetermined threshold, such as a rapid deceleration. The inflation fluid is released to exit the storage chamber 96 and to flow outward from the inflator 18a through the discharge openings 104 to inflate the air bag 16.

To assemble the vehicle safety apparatus 10a, the air bag 16 is folded and retained in the mouth portion 44 of the reaction canister 14a. The inflator 18a is then axially inserted along central axis 84, through the first opening 52, into the chamber 40 of the reaction canister 14a. Specifically, the second end 90a of the inflator 18a is inserted initially through the first opening 52 and continues to move along axis 84 into the chamber 40 toward the second end wall 26a until the second end wall 94a of the inflator 18a engages the circular portion 204 of the second end wall of the reaction canister 14a. The second end wall 94a of the inflator is directed to lie flat against the circular portion 204 of the second end wall 26a of the reaction canister 14a due to the inwardly curved surface 210 of the raised rib portion 202 of the second end wall of the reaction canister. As the flat surface of the second end wall 94a of the inflator 18a is urged against the inwardly curved surface 210 of the raised rib portion 202, the second end wall of the inflator is guided down the inwardly curved surface to the flat circular portion 204 of the second end wall 26a of the reaction canister 14a.

Once the second end wall 94a of the inflator 18a is lying flat against the circular portion 204 of the second end wall 26a of the reaction canister 14a, the inflator is positioned so that the threaded openings 208 of the inflator are aligned with the fastener openings 206 in the second end wall of the reaction canister. A plurality of screws 216 are inserted through the plurality of fastener openings 206 and into the aligned plurality of threaded openings 208. The screws 216 are then tightened, thus drawing the inflator 18a further into the chamber 40 and securing the second end 90a of the inflator 18a to the second end wall 26a of the reaction canister 14a.

As the inflator 18a continues its forward movement into the chamber 40, due to the tightening of the screws 216, the bent portion 160 of the connecting portion 142 of the flange member 130 is urged into the first opening 52 and wedged against the rim portion 50, thereby also securing the first end 86 of the inflator 18a to the first end wall 24 of the reaction canister 14a.

The air bag module 12a is then attached to the vehicle (not shown) by the second plurality of rivets 166, or other conventional means.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle during a vehicle collision above a predetermined threshold, said apparatus comprising:

a reaction canister;

an inflatable vehicle occupant protection device located in said reaction canister;

an inflator for supplying inflation fluid to inflate said inflatable vehicle occupant protection device;

said reaction canister having a main body portion, a first end wall and a second end wall opposing said first end wall, said first and second end walls being fixed to said main body portion and defining a chamber, said first end wall having an inner surface and an outer surface, said first end wall further having a first opening therein having a first diameter, said second end wall also having an inner surface and an outer surface;

said inflator having a cylindrical body portion having a first end terminating in a first end wall and a second end opposite said first end, said cylindrical body portion having a second diameter smaller than said first diameter, said inflator being axially insertable, through said first opening, into said chamber;

a flange member fixed to said first end wall of said inflator;

means for clamping said flange member against said outer surface of said first end wall; and means for supporting said inflator on said second end wall;

said means for supporting said inflator on said second end wall comprising a plurality of screws, each of said plurality of screws being insertable (i) through one of a plurality of openings in said second end wall and (ii) into one of a plurality of threaded openings in said second end of said inflator, each of said screws, when inserted through one of said plurality of openings and into one of said plurality of threaded openings being secured to said inflator for supporting said inflator on said second end wall;

said outer surface of said first end wall comprising a tapered rim portion defining said first opening, and said means for clamping said flange member against said outer surface of said first end wall comprising said screws, which when secured to said inflator, urge portions of said flange member into said tapered rim portion and clamp said flange member against said outer surface of said first end wall.

2. An apparatus for helping to protect an occupant of a vehicle during a vehicle collision above a predetermined threshold, said apparatus comprising:

a reaction canister;

an inflatable vehicle occupant protection device located in said reaction canister;

an inflator for supplying inflation fluid to inflate said inflatable vehicle occupant protection device;

said reaction canister having a main body portion, a first end wall, and a second end wall opposing said first end wall, said main body and said first and second end walls defining a chamber, said first end wall having an inner surface and an outer surface, said first end wall further having a first opening therein having a first diameter, said second end wall also having an inner surface and an outer surface, said second end wall further having a plurality of openings;

said inflator having a cylindrical body portion having a first end and a second end opposite said first end, said cylindrical body portion having a second diameter smaller than said first diameter, said second end having a plurality of threaded openings;

a flange member fixed to said first end of said inflator, said inflator being axially insertable, through said first opening, into said chamber;

means for clamping said flange member against said outer surface of said first end wall, said second end of said inflator abutting said second end wall when said inflator is inserted completely into said chamber; and a plurality of screws, each of said plurality of screws being insertable through one of said plurality of openings and into one of said plurality of threaded openings, each of said screws, when inserted through one of said plurality of openings and into one of said plurality of threaded openings being secured to said inflator for supporting said inflator on said second end wall;

said second end wall having a circular portion, said second end of said inflator abutting said second end wall at said circular portion when said inflator is inserted completely into said chamber;

said second end wall having means for guiding said second end of said inflator to said circular portion;

said means for guiding said second end of said inflator to said circular portion comprises an annular rib portion disposed on said second end wall, said annular rib portion circumscribing said circular portion and having an inwardly curved surface extending to the circumference of said circular portion.

3. An apparatus for helping to protect an occupant of a vehicle during a vehicle collision above a predetermined threshold, said apparatus comprising:

a reaction canister;

an inflatable vehicle occupant protection device located in said reaction canister;

an inflator for supplying inflation fluid to inflate said inflatable vehicle occupant protection device;

said reaction canister having a main body portion, a first end wall, and a second end wall opposing said first end wall, said main body and said first and second end walls defining a chamber, said first end wall having an inner surface and an outer surface, said first end wall further having a first opening therein having a first diameter, said second end wall also having an inner surface and an outer surface, said second end wall further having a plurality of openings;

said inflator having a cylindrical body portion having a first end and a second end opposite said first end, said cylindrical body portion having a second diameter smaller than said first diameter, said second end having a plurality of threaded openings;

a flange member fixed to said first end of said inflator, said inflator being axially insertable, through said first opening, into said chamber;

means for clamping said flange member against said outer surface of said first end wall, said second end of said inflator abutting said second end wall when said inflator is inserted completely into said chamber; and a plurality of screws, each of said plurality of screws being insertable through one of said plurality of openings and into one of said plurality of threaded openings, each of said screws, when inserted through one of said plurality of openings and into one of said plurality of threaded openings being secured to said inflator for supporting said inflator on said second end wall;

said outer surface of said first end wall comprising a tapered rim portion defining said first opening, and said means for clamping said flange member against said outer surface of said first end wall comprises said screws, which when secured to said inflator, urge portions of said flange member into said tapered rim portion and clamp said flange member against said outer surface of said first end wall.

4. An apparatus for helping to protect an occupant of a vehicle during a vehicle collision above a predetermined threshold, said apparatus comprising:

a reaction canister;

an inflatable vehicle occupant protection device located in said reaction canister;

an inflator for supplying inflation fluid to inflate said inflatable vehicle occupant protection device;

said reaction canister having a main body portion, a first end wall and a second end wall opposing said first end wall, said first and second end walls being fixed to said main body portion and defining a chamber, said first end wall having an inner surface and an outer surface, said first end wall further having a first opening therein having a first diameter, said second end wall also having an inner surface and an outer surface;

said inflator having a cylindrical body portion centered on an axis, said inflator body portion having a first end terminating in a first end wall and a second end opposite said first end, said cylindrical body portion having a second diameter smaller than said first diameter, said inflator being axially insertable, through said first opening, into said chamber;

a flange member having a first planar portion fixed to said first end wall of said inflator and a second planar portion spaced along said axis in a direction away from said inflator and from said first planar portion;

means for clamping said second planar portion of said flange member against said outer surface of said first end wall;

means for supporting said inflator on said second end wall; and said means for supporting said inflator on said second end wall comprises a flanged rim portion of said second end wall defining a second opening, said inflator having a circular O-ring received about said second end of said inflator, said second end of said inflator being received within said second opening with said O-ring engaging said flanged rim portion.

5. An apparatus for helping to protect an occupant of a vehicle during a vehicle collision above a predetermined threshold, said apparatus comprising:

a reaction canister;

an inflatable vehicle occupant protection device located in said reaction canister;

an inflator for supplying inflation fluid to inflate said inflatable vehicle occupant protection device;

said reaction canister having a main body portion, a first end wall and a second end wall opposing said first end wall, said first and second end walls being fixed to said main body portion and defining a chamber, said first end wall having an inner surface and an outer surface, said first end wall further having a first opening therein having a first diameter, said second end wall also having an inner surface and an outer surface;

said inflator having a cylindrical body portion centered on an axis, said inflator body portion having a first end terminating in a first end wall and a second end opposite said first end, said cylindrical body portion having a second diameter smaller than said first diameter, said inflator being axially insertable, through said first opening, into said chamber;

a flange member having a first planar portion fixed to said first end wall of said inflator and a second planar portion spaced along said axis in a direction away from said inflator and from said first planar portion;

means for clamping said second planar portion of said flange member against said outer surface of said first end wall;

means for supporting said inflator on said second end wall;

said means for clamping said second planar portion of said flange member against said outer surface of said first end wall comprises a plurality of rivets extending through said second planar portion of said flange member and said first end wall; and said means for supporting said inflator on said second end wall comprises a flanged rim portion of said second end wall defining a second opening, said inflator having a circular O-ring received about said second end of said inflator, said second end of said inflator being received within said second opening with said O-ring engaging said flanged rim portion.

* * * * *